(12) United States Patent
Kali

(10) Patent No.: US 7,827,479 B2
(45) Date of Patent: Nov. 2, 2010

(54) SYSTEM AND METHODS FOR SYNCHRONIZED MEDIA PLAYBACK BETWEEN ELECTRONIC DEVICES

(76) Inventor: Damon K. I. Kali, 1085 Tasman Dr., #685, Sunnyvale, CA (US) 94089

( * ) Notice: Subject to any disclaimer, the term of this patent is extended or adjusted under 35 U.S.C. 154(b) by 908 days.

(21) Appl. No.: 11/648,970

(22) Filed: Jan. 3, 2007

(65) Prior Publication Data

US 2008/0162665 A1    Jul. 3, 2008

(51) Int. Cl.
*G06F 17/00* (2006.01)
(52) U.S. Cl. .......... 715/229; 709/231; 348/512
(58) Field of Classification Search .......... 715/203; 348/512
See application file for complete search history.

(56) References Cited

U.S. PATENT DOCUMENTS

| | | | | |
|---|---|---|---|---|
| 4,731,676 | A * | 3/1988 | Berlekamp | 360/26 |
| 4,907,080 | A * | 3/1990 | Campbell et al. | 348/161 |
| 6,173,022 | B1 * | 1/2001 | McPherson et al. | 375/355 |
| 6,372,974 | B1 * | 4/2002 | Gross et al. | 84/609 |
| 7,301,092 | B1 * | 11/2007 | McNally et al. | 84/612 |
| 7,500,176 | B2 * | 3/2009 | Thomson et al. | 715/202 |
| 7,631,119 | B2 * | 12/2009 | Moore et al. | 710/52 |
| 2003/0017823 | A1 * | 1/2003 | Mager et al. | 455/414 |
| 2003/0018662 | A1 * | 1/2003 | Li | 707/500.1 |
| 2003/0164845 | A1 * | 9/2003 | Fayan et al. | 345/722 |
| 2005/0028195 | A1 * | 2/2005 | Feinleib et al. | 725/32 |
| 2005/0111827 | A1 * | 5/2005 | Sullivan | 386/65 |
| 2005/0213826 | A1 * | 9/2005 | Neogi | 382/232 |
| 2005/0217462 | A1 * | 10/2005 | Thomson et al. | 84/612 |
| 2005/0227674 | A1 * | 10/2005 | Kopra et al. | 455/414.1 |
| 2006/0146850 | A1 * | 7/2006 | Virdi et al. | 370/412 |
| 2006/0149850 | A1 * | 7/2006 | Bowman | 709/231 |
| 2006/0156375 | A1 * | 7/2006 | Konetski | 725/135 |
| 2006/0179160 | A1 * | 8/2006 | Uehara et al. | 709/248 |
| 2006/0227245 | A1 * | 10/2006 | Poimboeuf et al. | 348/512 |
| 2006/0242106 | A1 * | 10/2006 | Bank | 707/1 |
| 2006/0270395 | A1 * | 11/2006 | Dhawan et al. | 455/418 |
| 2007/0079352 | A1 * | 4/2007 | Klein, Jr. | 725/135 |
| 2007/0136769 | A1 * | 6/2007 | Goldberg et al. | 725/81 |
| 2007/0143493 | A1 * | 6/2007 | Mullig et al. | 709/232 |
| 2007/0250761 | A1 * | 10/2007 | Bradley et al. | 715/500.1 |
| 2008/0120501 | A1 * | 5/2008 | Jannink et al. | 713/163 |
| 2009/0222520 | A1 * | 9/2009 | Sloo et al. | 709/205 |

* cited by examiner

*Primary Examiner*—Laurie Ries
*Assistant Examiner*—Mustafa Amin
(74) *Attorney, Agent, or Firm*—Kali Law Group, P.C.

(57) ABSTRACT

Methods for synchronized media playback between a number of electronic media devices wherein the electronic media devices are in electronic communication are presented, the methods including: creating a media play list on an originating media device, selecting a member media device for sharing the media play list; negotiating the media play list by the at member media device wherein the negotiating the media play list includes, searching the member media device for at least one matching candidate, wherein the searching is enabled by comparing a number of candidate indicia with a number of matching candidate indicia, selecting one of the at least one matching candidates for inclusion on a member media play list, conforming the at least one matching candidate, and populating the member media play list with the at least one matching candidate; and playing the media play list and the member media play list.

23 Claims, 11 Drawing Sheets

| MEDIA PLAY LIST | | |
|---|---|---|
| TITLE (804) | ARTIST (806) | OTHER INDICIA |
| TITLE (1) | ARTIST (1) | OTHER INDICIA (1) |
| TITLE (2) | ARTIST (2) | OTHER INDICIA (2) |
| ... | ... | ... |
| TITLE (N) | ARTIST (N) | OTHER INDICIA (N) |

| MEMBER MATCH LIST | | |
|---|---|---|
| TITLE (824) | ARTIST (826) | DURATION |
| TITLE (1.1) | ARTIST (1.1) | DURATION (1.1) |
| TITLE (1.2) | ARTIST (1.2) | DURATION (1.2) |
| ... | ... | ... |
| TITLE (1.M) | ARTIST (1.M) | DURATION (1.M) |

| MEMBER PLAY LIST | | |
|---|---|---|
| TITLE (844) | ARTIST (846) | OTHER INDICIA |
| TITLE (1.A) | ARTIST (1.A) | OTHER INDICIA (1.A) |
| TITLE (2.B) | ARTIST (2.B) | OTHER INDICIA (2.B) |
| ... | ... | ... |
| TITLE (N.Z) | ARTIST (N.Z) | OTHER INDICIA (N.Z) |

FIG. 8C

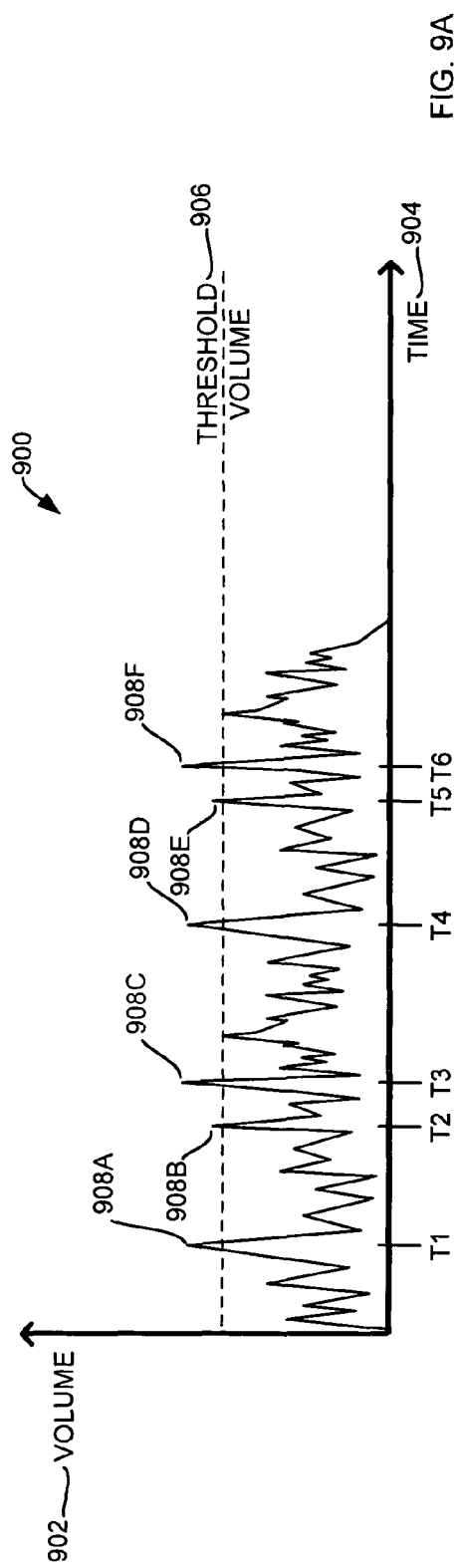
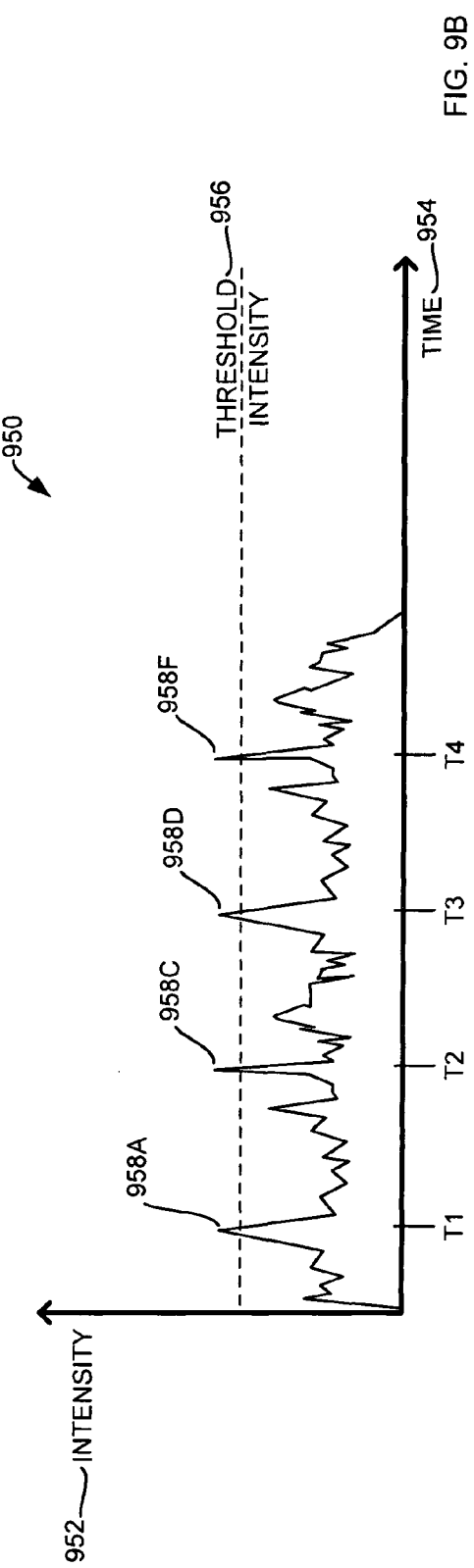
FIG. 9A
FIG. 9B

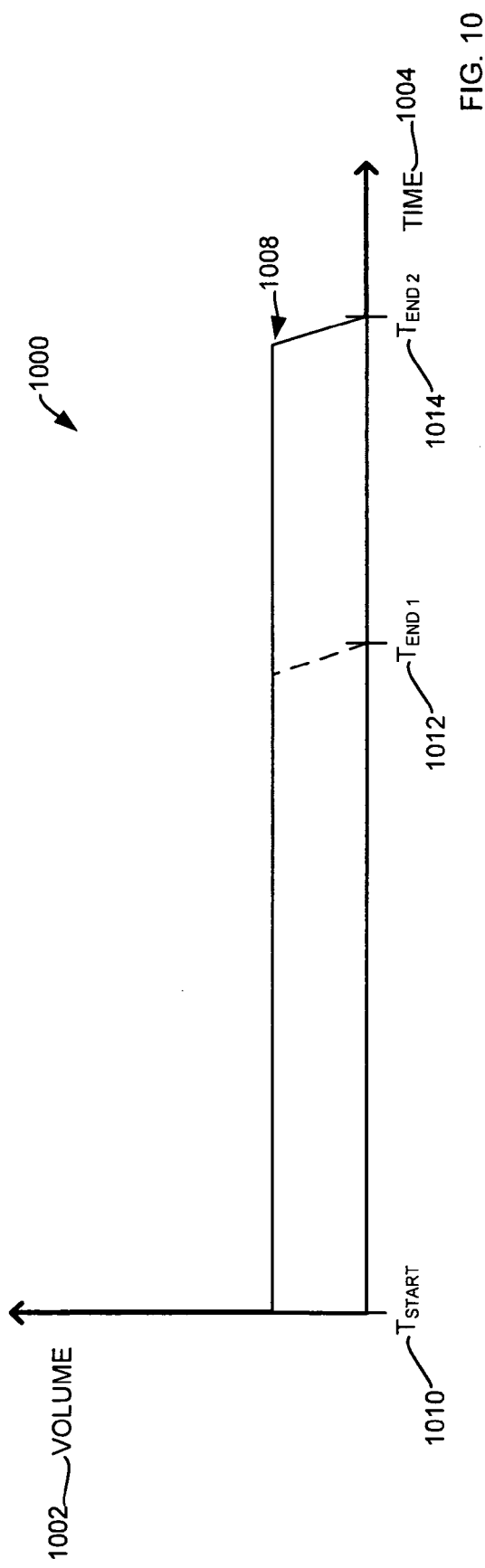

SYSTEM AND METHODS FOR SYNCHRONIZED MEDIA PLAYBACK BETWEEN ELECTRONIC DEVICES

BACKGROUND

The use of electronic devices has increased steadily since the development of transistorized circuitry. Portable electronic devices, in particular, have proliferated modern technological societies. These devices continue to enjoy a rich array of features and benefits as technology paces market demand. Indeed, the lines between products continue to blur as dedicated devices evolve to achieve multifunctional capability. In some cases, electronic communication between electronic devices has provided synergistic effects. That is, a personal digital assistant (PDA) that once served only as a storage medium for a user may now be utilized as a transmission and reception device for sharing files, thus eliminating the tedious chore of manually entering data and further assuring that shared data is more consistently passed from one user to another.

Sharing data may embody many different forms. For example, sharing data may be limited to one-way transmissions or reception, or, in other examples, may be fully bidirectional. As with any technological improvement, sharing data brings unexpected benefits as technological obstacles are overcome. FIG. 1 is an illustrative prior art representation of a number of mobile devices sharing files such as is described in U.S. Patent Publication No. 2006/0270395, which is incorporated herein by reference. As illustrated mobile device 102.1 includes a sync module 104.1. Sync module may be utilized to synchronize playback among any number of other mobile devices such as mobile devices 102.2 to 102.*n* each having sync modules 104.2 to 104.*n* respectively. In these examples, a shared song may be heard by all participants at roughly the same time. Thus, users may share a common listening experience in private. Methods provided for the system as described above rely on sharing copies of the same file. In this manner, synchronization may be readily attained across devices.

However, sharing copies of the same file may, in some instances, not be entirely practical. Licensing has increasingly become a critical issue when attempting to distribute media. Thus, any sharing system would require some method of either extracting a licensing fee from other users or providing for limited use of files. As may be appreciated, in either case, the transfer of large media files would tend to slow the distribution of a play list and may, in some examples, provide an undesirable user experience. Further, because users tending to share audio and video files in this manner also tend to have similar tastes, the likelihood that sharing users have similar files is high. Thus, requiring file transfers may exert an undue overhead on bandwidth for the members sharing the files.

Therefore, systems and methods for synchronized media playback between electronic devices, which provide for a shared experience having enhanced synchronization and avoiding unnecessary file transfers are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for synchronized media playback between a number of electronic media devices wherein the electronic media devices are in electronic communication are presented, the method including: creating a media play list on an originating media device, wherein the media play list includes at least one candidate, the at least one candidate including a number of candidate indicia, selecting at least one member media device for sharing the media play list; negotiating the media play list by the at least one member media device wherein the negotiating the media play list includes, searching the at least one member media device for at least one matching candidate, the at least one matching candidate including a number of matching candidate indicia, wherein the searching is enabled by comparing the number of candidate indicia with the number of matching candidate indicia, if the at least one matching candidate is found, selecting one of the at least one matching candidates for inclusion on a member media play list, conforming the at least one matching candidate based on the number of candidate indicia and on the number of matching candidate indicia, and populating the member media play list with the at least one matching candidate; and playing the media play list and the member media play list, wherein at least one candidate and the at least one matching candidate are started at substantially the same time on all devices such that a start synchronizing is achieved.

In some embodiments, methods are presented wherein the creating the media play list includes: selecting the at least one candidate for inclusion on the media play list, identifying the number of candidate indicia corresponding with the at least one candidate, and appending the media play list to include the at least one candidate and the number of candidate indicia; and wherein, the selecting one of the at least one matching candidates includes: selecting the at least one matching candidate for inclusion on the member media play list, and identifying the number of matching candidate indicia corresponding with the at least one matching candidate. In some embodiments, method further include: synchronizing the at least one candidate and the at least one matching candidate during a media playback such that a playback synchronizing is achieved, the playback synchronizing including, determining a synchronization state of the at least one matching candidate based upon the candidate audio profile and the matching audio profile, the determining proceeding at a sampling rate, if the playback synchronization is achieved, continuing to the determining a synchronization state at the sampling rate, and if the playback synchronization is not achieved, adjusting a playback speed of the at least one matching candidate to match the at least one candidate. In some embodiments, conforming includes: determining the candidate duration of the at least one candidate; determining the matching duration of the at least one matching candidate selected; and if the matching duration is longer than the candidate duration, trimming the matching duration such that the matching duration is substantially equal to the candidate duration.

In other embodiments, methods for synchronized media playback between media devices are provided wherein the media devices are in electronic communication, the methods including: creating a media play list on an originating media device, wherein the media play list includes at least one candidate, the at least one candidate including a number of candidate indicia, selecting at least one member media device for sharing the media play list; negotiating the media play list by the at least one member media device wherein the negotiating the media play list includes, searching the at least one member media device for at least one matching candidate, the at least one matching candidate including a number of matching candidate indicia, wherein the searching is enabled by comparing the number of candidate indicia with the number of matching candidate indicia, if the at least one matching candidate is found, selecting one of the at least one matching candidates for inclusion on a member media play list, conforming the at least one matching candidate based on the number of candidate indicia and on the number of matching candidate indicia, wherein the conforming includes, determining a candidate duration of the at least one candidate, determining a matching duration of the at least one matching candidate selected, if the matching duration is longer than the candidate duration, trimming the matching duration such that the matching duration is substantially equal to the candidate duration, if the matching duration is shorter than the candidate duration, generating a notice, and populating the member media play list with the at least one matching candidate; and playing the media play list and the member media play list, wherein the lists are started at substantially the same time on all devices such that a start synchronizing is achieved.

In other embodiments, a computer-readable storage medium containing a set of instructions for a general purpose computer is presented, the set of instructions including: creating a media play list on an originating media device, wherein the media play list includes at least one candidate, the at least one candidate including a number of candidate indicia, selecting at least one member media device for sharing the media play list; negotiating the media play list by the at least one member media device wherein the negotiating the media play list includes, searching the at least one member media device for at least one matching candidate, the at least one matching candidate including a number of matching candidate indicia, wherein the searching is enabled by comparing the number of candidate indicia with the number of matching candidate indicia, if the at least one matching candidate is found, selecting one of the at least one matching candidates for inclusion on a member media play list, conforming the at least one matching candidate based on the number of candidate indicia and on the number of matching candidate indicia, and populating the member media play list with the at least one matching candidate; and playing the media play list and the member media play list, wherein the lists are started at substantially the same time on all devices such that a start synchronizing is achieved.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 8A-8C are illustrative representations of lists generated in accordance with embodiments of the present invention;

FIGS. 9A-9B are illustrative representations of graphs utilized for profiling media in accordance with embodiments of the present invention; and FIG. 10 is an illustrative representation of a graph demonstrating trimming in accordance with embodiments of the present invention.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
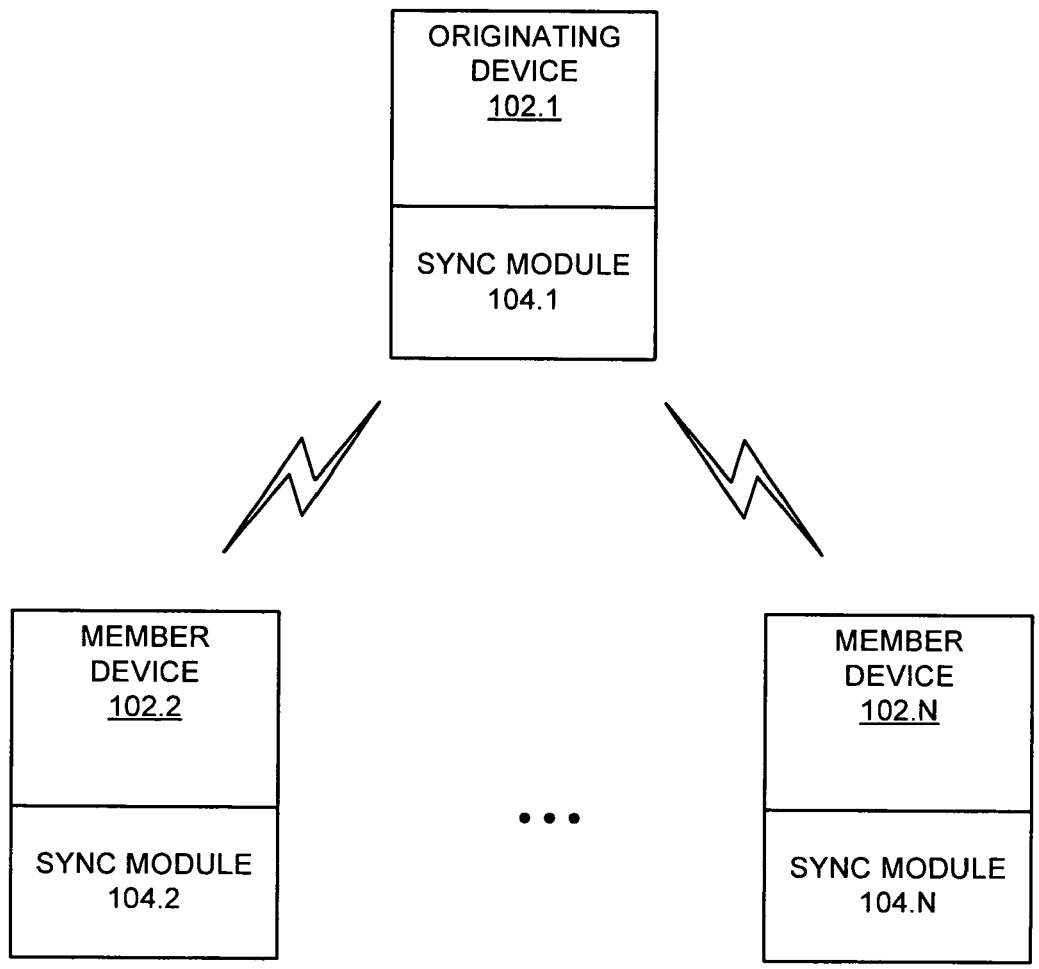
FIG. 1 is an illustrative prior art representation of a number of mobile devices sharing files.
Figure 2:
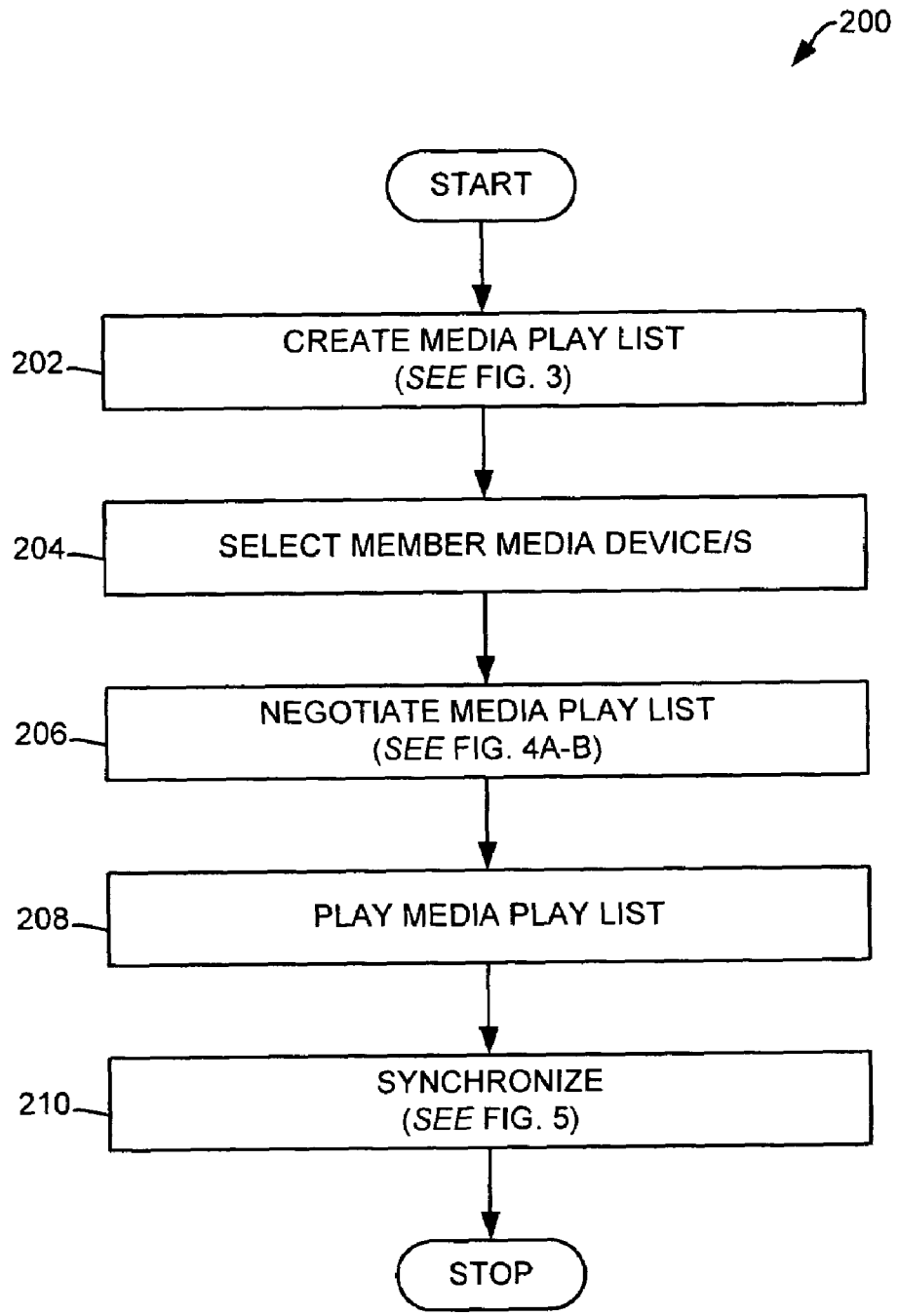
FIG. 2 is an illustrative overview flowchart for synchronized media playback in accordance with embodiments of the present invention.

As used herein, the term "synchronized" refers to events that occur at substantially the same time. Thus, for example, in an audio embodiment, synchronized playback refers to at least two sources of audio being played at substantially the same time. Strict synchronization, which may be defined as two events occurring at exactly the same time, may be desirable, but is not always practical. As such, it is not the intent of the invention described herein to restrict the meaning of synchronization and similar terminology to a strict synchronization interpretation. FIG. 2 is an illustrative overview flowchart for synchronized media playback 200 in accordance with embodiments of the present invention. As may be appreciated, media may include audio, video, and audio/video streams without departing from the present invention. Furthermore, any number of portable electronic devices such as a PDA, an MP3 player, an audio playback device, a cellular phone, a video playback device, or any other electronic device capable of playing media, processing information, and communicating with other devices may be configured to use methods described herein without departing from the present invention. Still further, external devices that extend the functionality of existing electronic devices may be utilized without departing from the present invention. Thus, at a first step 202, a media play list may be created on an originating media device. A media play list may include one or more candidates that may ordered in accordance with a user specification. A candidate may be a text file, an image file, an audio file, a video file, or an audio/video file that a user desires to share with other media devices without departing from the present invention. Creation of a media play list will be discussed in further detail below for FIG. 3.

At a next step 204, the method selects all member media devices for sharing a media play list. Member media devices may be defined as any device having sufficient capability to enable embodiments described herein. Capability may be achieved utilizing internal circuitry or external adaptive devices. Thus, legacy systems may, in some examples, be utilized without limitation without departing from the present invention. Member media devices need not be the same device as an originating media device. Further member media devices need not be the same other member media devices for utilizing embodiments described herein. At a next step 208, the method negotiates a media play list. Negotiating is a process by which play lists are generated on member media devices. These play lists are filled with matching candidates. Matching candidates are not simply the same file as a candidate. It may be appreciated that member media devices may be populated with media that, in some instances, is similar, but not exactly the same as media on an originating media device. One object of the present invention is to utilize media that all ready exists on a member media device for shared playback. In this manner, licensing requirements and file transfers may, in some examples, be avoided utilizing embodiments described herein. Negotiating will be discussed in further detail below for FIGS. 4A-4B.

At a next step, a media play list is played. In some embodiments, candidates and matching candidates that populate media lists are started at substantially the same time thus achieving a start synchronization. Starting a candidate and corresponding matching candidates at the substantially the same time may be accomplished in any number of manners known in the art without departing from the present invention. For example, as may be appreciated, system clocks may be present in all media devices. In some embodiments, an originating media device may poll member media devices for member media device system times, which may then be tracked relative to originating media device system time. Tracked times may, in turn, be utilized for establishing a common start time. In other embodiments, a timed pulse may be sent by an originating media device to member media devices to establish a start time. As may be appreciated, play lists may be started and stopped by any or all sharing members in accordance with user preferences without departing from the present invention.

At a next step 210, the method optionally continues to synchronize candidates and matching candidates during playback to achieve playback synchronization. It may be desirable, in some embodiments, to achieve further synchronization. The method may utilize indicia to provide additional synchronization. In some embodiments, indicia include data which identifies a candidate and may include: a title, an artist, a duration, an identifier, an audio profile, and a video profile. After indicia are identified, they may be utilized to provide synchronization. Synchronization will be discussed in further detail below for FIGS. 6-7.

Figure 3:
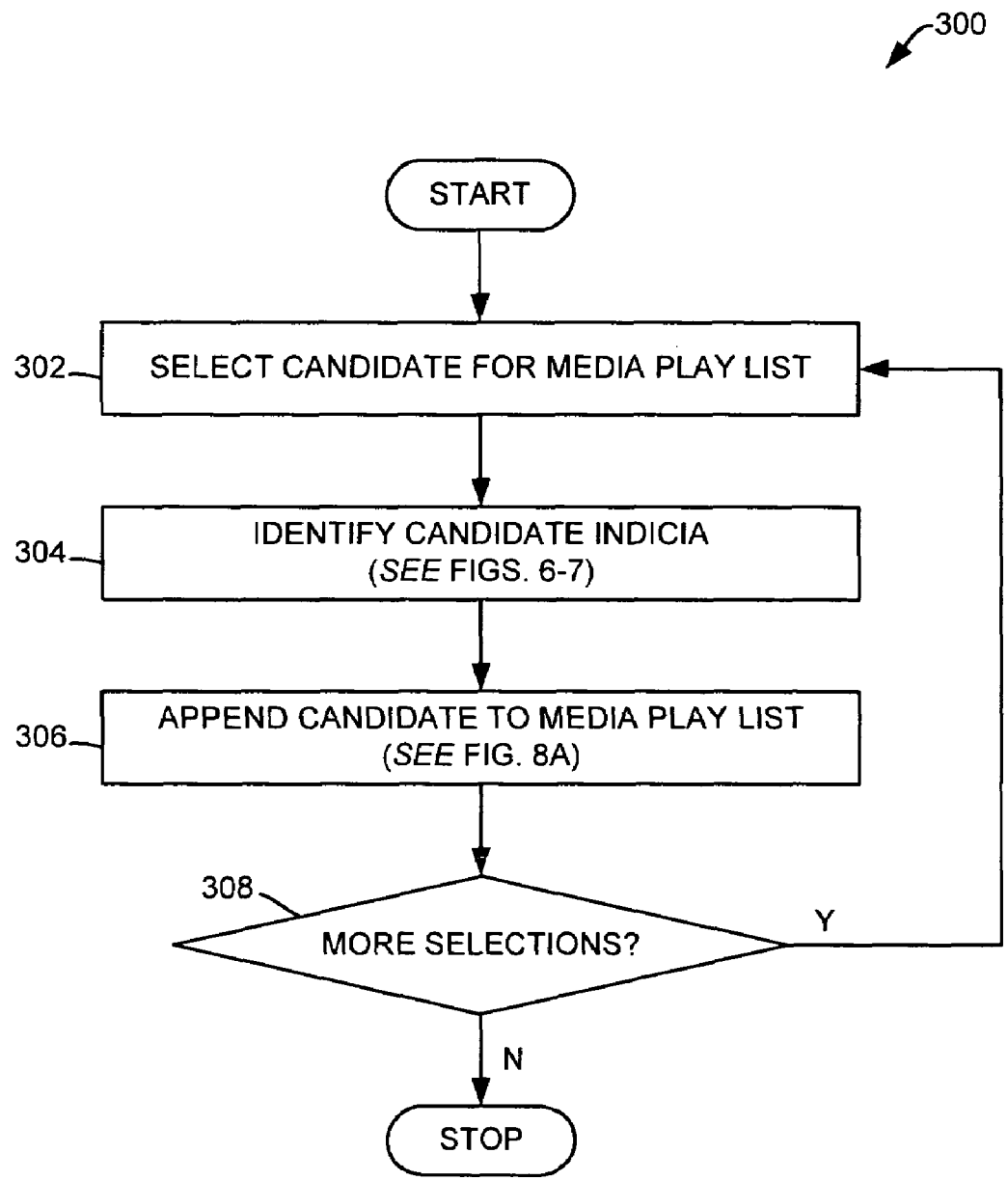
FIG. 3 is an illustrative flowchart for creating a media play list in accordance with embodiments of the present invention.

FIG. 3 is an illustrative flowchart for creating a media play list 300 in accordance with embodiments of the present invention. FIG. 3 further describes step 202 of FIG. 2. At a first step, 302, a candidate is selected for a play list. As noted above, a candidate may be a text file, an image file, an audio file, a video file, or an audio/video file that a user desires to share with other media devices without departing from the present invention. Candidates may be attained in any manner well-known in the art and may be selected in any combination without departing from the present invention. Once a candidate is selected, the method identifies candidate indicia at a step 304. As noted above, candidate indicia may include data which identifies a candidate and may include: a title, an artist, a duration, an identifier, an audio profile, and a video profile. A duration represents a total play back time for media. An audio profile is a list of points in an audio file that exceed a pre-determined threshold. In one embodiment, the threshold is volume. In some embodiments, the pre-determined threshold may be automatically adjusted to provide a number of points within a desired range. The points may be utilized for additional synchronization. Audio profiles are discussed in further detail below for FIG. 6. A video profile is a list of points in a video file that exceed a pre-determined threshold. In one embodiment, the threshold is contrast intensity. In other embodiments, the threshold is gamma intensity. In some embodiments, the pre-determined threshold may be automatically adjusted to provide a number of points within a desired range. The points may be utilized for additional synchronization. Video profiles are discussed in further detail below for FIG. 7.

At a next step 306, the candidate is appended to a media play list. Candidate indicia are stored for transmission to a member media device. Candidate indicia may be stored in a media play list or may be stored in a separate list that is associated with a media play list without departing from the present invention. At a next step 308 if additional selections are desired, the method returns to a step 302 to make more selections. If no additional selections are desired at a step 308, the method ends.

Figure 4A:
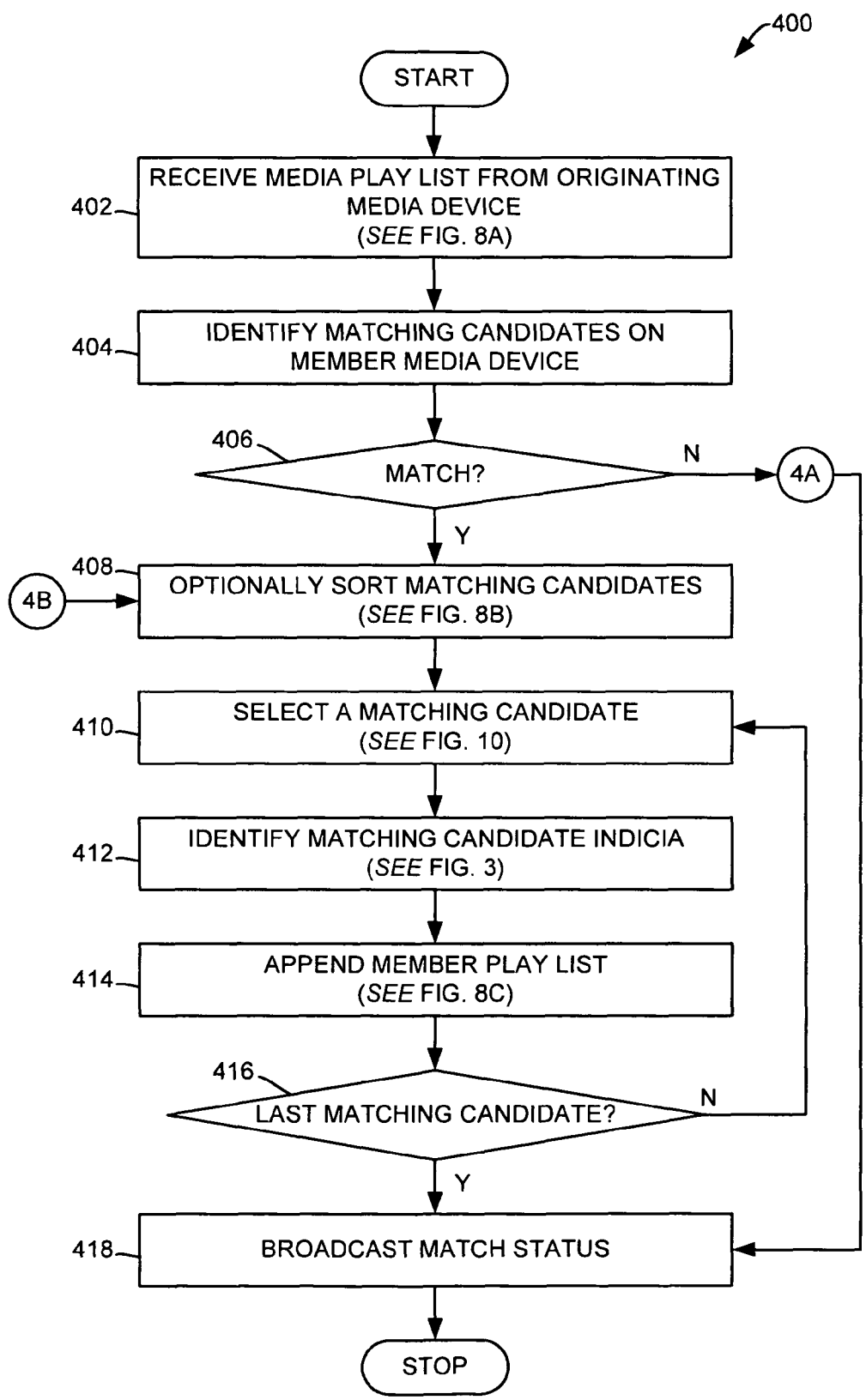
FIGS. 4A-4B are illustrative flowcharts for negotiating a media play list in accordance with embodiments of the present invention.

FIG. 4A is an illustrative flowchart for negotiating a media play list 400 in accordance with embodiments of the present invention. FIG. 4A further describes step 206 of FIG. 2. FIG. 4A will be further discussed along with FIGS. 8A-8C, which are illustrative representations of lists generated in accordance with embodiments of the present invention. Thus, at a first step 402, a media play list is received by a member media device selected at a step 204 (FIG. 2). A media play list 800 from an originating device may take the form as illustrated in FIG. 8A. In FIG. 8A, media play list 800 includes title indicia 802, artist indicia 804, and other indicia 806 without limitation such as a duration, an identifier, an audio profile, and a video profile as indicated above. Any number of songs 802.1-802.n by any number of artists 804.1-804.n having any number of other indicia 806.1-806.n may populate media play list 800.

Returning to FIG. 4, at a next step 404, the method identifies any matching candidates on a member media device. That is, a member media device is searched based on search criteria to find any matching candidates which match or closely resemble a candidate. One purpose of this step is to utilize existing media on a member media device. A member media device may be searched with any indicia from a candidate without departing from the present invention. In some embodiments, a member media device is searched by a title or some form of a title. In some embodiments, a member media device is searched by an artist or some form of an artist. Searching is well-known in the art and may be utilized without limitation without departing from the present invention. The method then determines whether a match exists at a step 406. If the method determines that a match does not exist at a step 406, the method continues to a step 418 to broadcast a match status. In some embodiments, the method determines that a match does not exist at a step 406, the method may optionally search for uploadable content at branch point 4A, which will be discussed in further detail below for FIG. 4B. If the method determines that a match exists at a step 406, the method optionally sorts matching candidates at a step 408. In some embodiments, the list is sorted in order of closest duration. An embodiment including a member match list 820 is illustrated in FIG. 8B. Member match list 820 may include matched songs 822.1.1-822.1.m having corresponding artist/s 824.1.1-824.1.m and corresponding duration 826.1.1-826.1.m.

At a next step 410, a matching candidate is selected. That is, one from the list of matching candidates is selected for inclusion on a member play list. Exact matches are not required as methods herein provide for adjusting a matching candidate with a candidate. For example, in utilized embodiments herein, one member media device may eventually playback a live version of media while another member media device may eventually playback a studio version of media during a shared playback experience. Thus, each user may ultimately select their favorite media version for playback in a shared environment. As such, a file transfer from an originating media device may not be required in some examples. When a matching candidate is selected that does not match duration of a candidate, trimming of a matching candidate may be required. Trimming is discussed in further detail below for FIG. 10. At a next step 412, the method identifies matching candidate indicia. Identifying matching candidate indicia proceeds in similar manner to identifying candidate indicia as discussed above for a step 304 (FIG. 3).

At a next step 414, a matching candidate is appended to a member play list. Matching candidate indicia may be stored in a member play list or may be stored in a separate list that is associated with a member play list without departing from the present invention. An embodiment including a member play list 840 is illustrated in FIG. 8C. Member play list may include title indicia 842, artist indicia 844, and other indicia 846 which may include without limitation such as duration, an identifier, an audio profile, and a video profile as indicated above. The method then determines whether any more matching candidates corresponding with a candidate in a media play list remain for selection at a step 416. If the method determines at a step 416 that additional matching candidates remain for selection, the method returns to a step 410 to select a matching candidate. If the method determines at a step 416 that no matching candidates remain for selection, then the method optionally broadcasts a member media device's match status at a step 418, whereupon the method ends. Match status broadcast may be accomplished in any manner well-known in the art without limitation and without departing from the present invention.

Figure 4B:
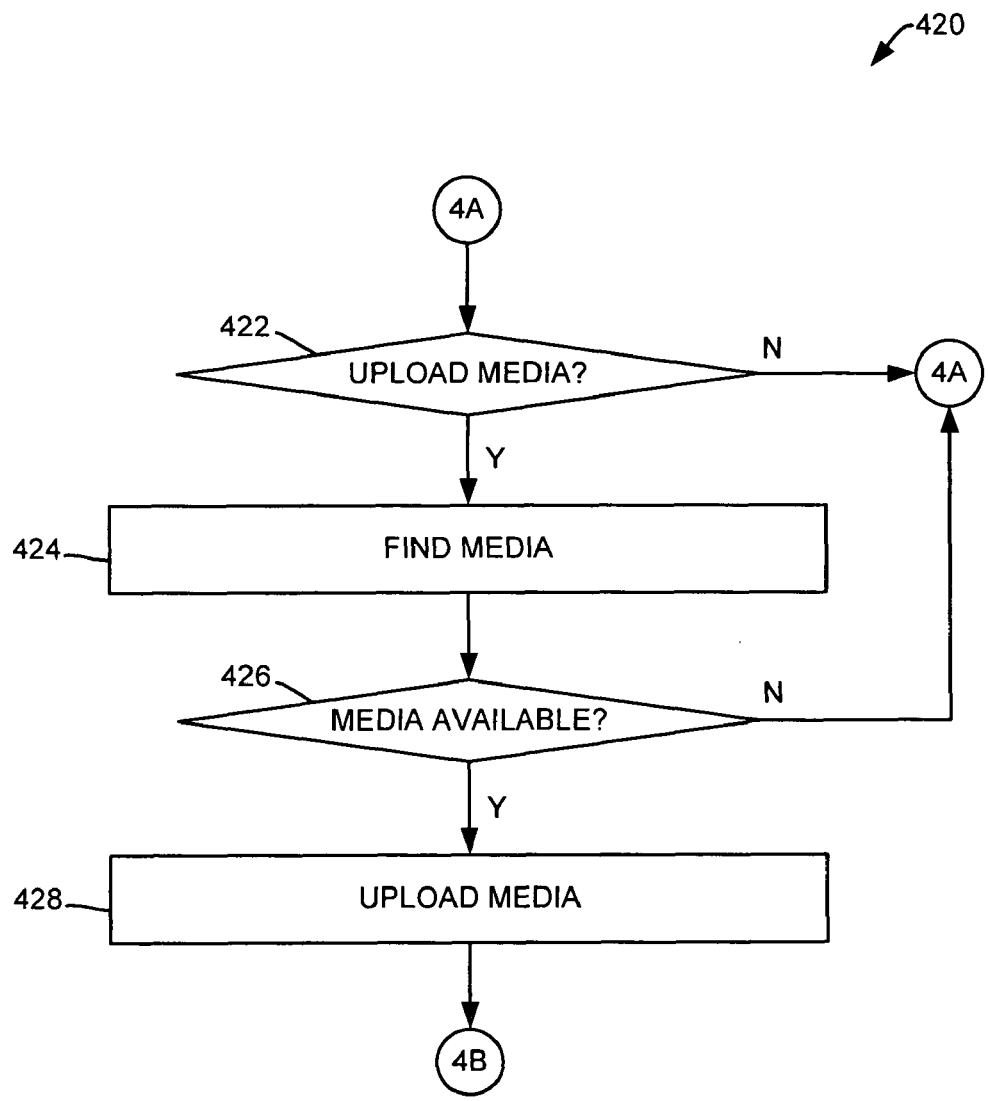

FIG. 4B is an illustrative flowchart of an optional upload of media 420 in accordance with embodiments of the present invention. FIG. 4B represents a branch point from a step 406 (FIG. 4A). Thus, if no match occurs at a step 406 (FIG. 4A), the method may optionally, at a step 422 determine whether to upload media. The method may query a user or may respond to a configuration setting to determine whether to upload without departing from the present invention. If the method determines at a step 422 to not upload media, the method returns to branch point 4A. If the method determines at a step 422 to upload media, the method searches for media at a step 426. Media may be searched from any media storage device including: an originating device, a member device, a media server, or an external media storage device without departing from the present invention. The method then determines whether media is available at a step 426. If the method determines at a step 426 that media is not available, the method returns to branch point 4A. If the method determines at a step 426 that media is available, the method uploads media at a step 428. In some examples, more than one media file may be uploaded such that more than one matching candidate is returned. Where licensing or purchasing is required, the method may utilize methods known in the art to accomplish a licensed upload without departing from the present invention. The method then returns to branch point 4B.

Figure 5:
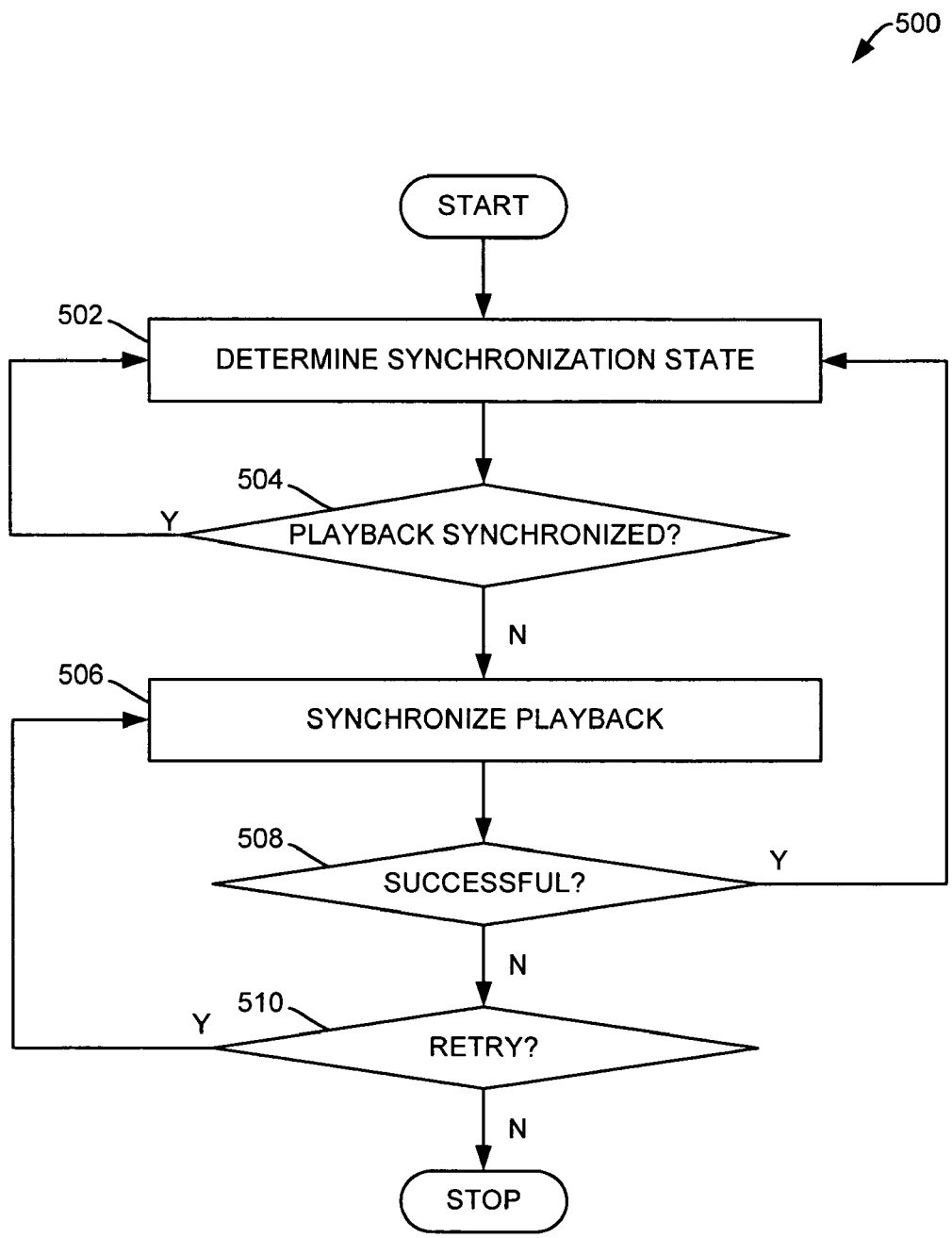
FIG. 5 is an illustrative flowchart for synchronizing a media play list in accordance with embodiments of the present invention.

FIG. 5 is an illustrative flowchart for synchronizing a media play list 500 in accordance with embodiments of the present invention. FIG. 5 further describes a step 210 (FIG. 2). As noted above, it may be desirable in some examples, to provide for additional synchronization. Synchronization may be based on audio profiles or video profiles which may be stored as media indicia. Audio profiles will be discussed in further detail below for FIG. 6. Video profiles will be discussed in further detail below for FIG. 7. At a first step 502, a synchronization state is determined. Determinations should be made at sampling rate that is high enough to provide for adequate synchronization, but not so high as to over burden a processing system which may result in processor delays. As such, in some embodiments, a sampling rate in the range of approximately 100 to 5000 milliseconds (ms). In other embodiments, a sampling rate is in the range of approximately 1000 to 2500 ms. A determination of whether a matching candidate is in synch with a candidate is based primarily on an audio or a video profile. As noted above, a start synchronization may be utilized so that all media is started at the same time. However, in some examples, media across different devices may lose synchronization to a degree that disrupts a user's shared experience. Additional synchronization may be provided to minimize that disruption. Audio profiles and video profiles each contain reference points which may be utilized to compare candidates with matching candidates to determine synchronization state.

At a next step 504, the method determines whether playback is synchronized. If the method determines at a step 504 that playback is synchronized, the method continues to a step 502 to determine synchronization at a sampling rate. As noted above, an acceptable range of synchronization may be utilized in some embodiments in practicing embodiments of the present invention. Thus, in some embodiments, a synchronization range is in the range approximately of 0 to 1000 ms. In other embodiments, a synchronization range is in the range of approximately 100 to 500 ms. If the method determines at a step 504 that playback is synchronized, the method continues to a step 506 to synchronize playback. One method of synchronization proceeds by comparing an audio profile of a matching candidate with an audio profile of a candidate. Since an audio profile is time related, small adjustments may be made at playback so that audio profiles may be matched. For example, if a matching candidate's audio profile indicates that the matching candidate is falling behind a candidate, playback may be subtly altered to speed up playback of a matching candidate. Conversely, if a matching candidate's audio profile indicates that the matching candidate is ahead of a candidate, playback may be altered to slow down playback of a matching candidate. In this manner, playback may be further synchronized. Any manner of modified playback methods known in the art may be utilized without departing from the present invention.

Another method of synchronization proceeds by comparing a video profile of a matching candidate with a video profile of a candidate. Since a video profile is time related, small adjustments may be made at playback so that video profiles may be matched. For example, if a matching candidate's video profile indicates that the matching candidate is falling behind a candidate, playback may be subtly altered to speed up playback of a matching candidate. Conversely, if a matching candidate's video profile indicates that the matching candidate is ahead of a candidate, playback may be subtly altered to slow down playback of a matching candidate. In this manner, playback may be further synchronized.

At a next step 508, the method determines whether synchronization was successful. If the method determines at a step 508 that synchronization was successful, the method continues to a step 502 to determine synchronization at a sampling rate. If the method determines that synchronization was not successful at a step 508, the method continues to a step 510 to determine whether a retry is necessary. Retry may be utilized to repeat a synchronization step. In some embodiments, a number of retries may be user configured whereupon a message may be broadcast to a user, or whereupon the method may discontinue sampling. If the method determines at a step 510 that a retry is necessary, the method returns to a step 506 to synchronize playback. If the method determines at a step 510 that a retry is not necessary, the method ends.

Figure 6:
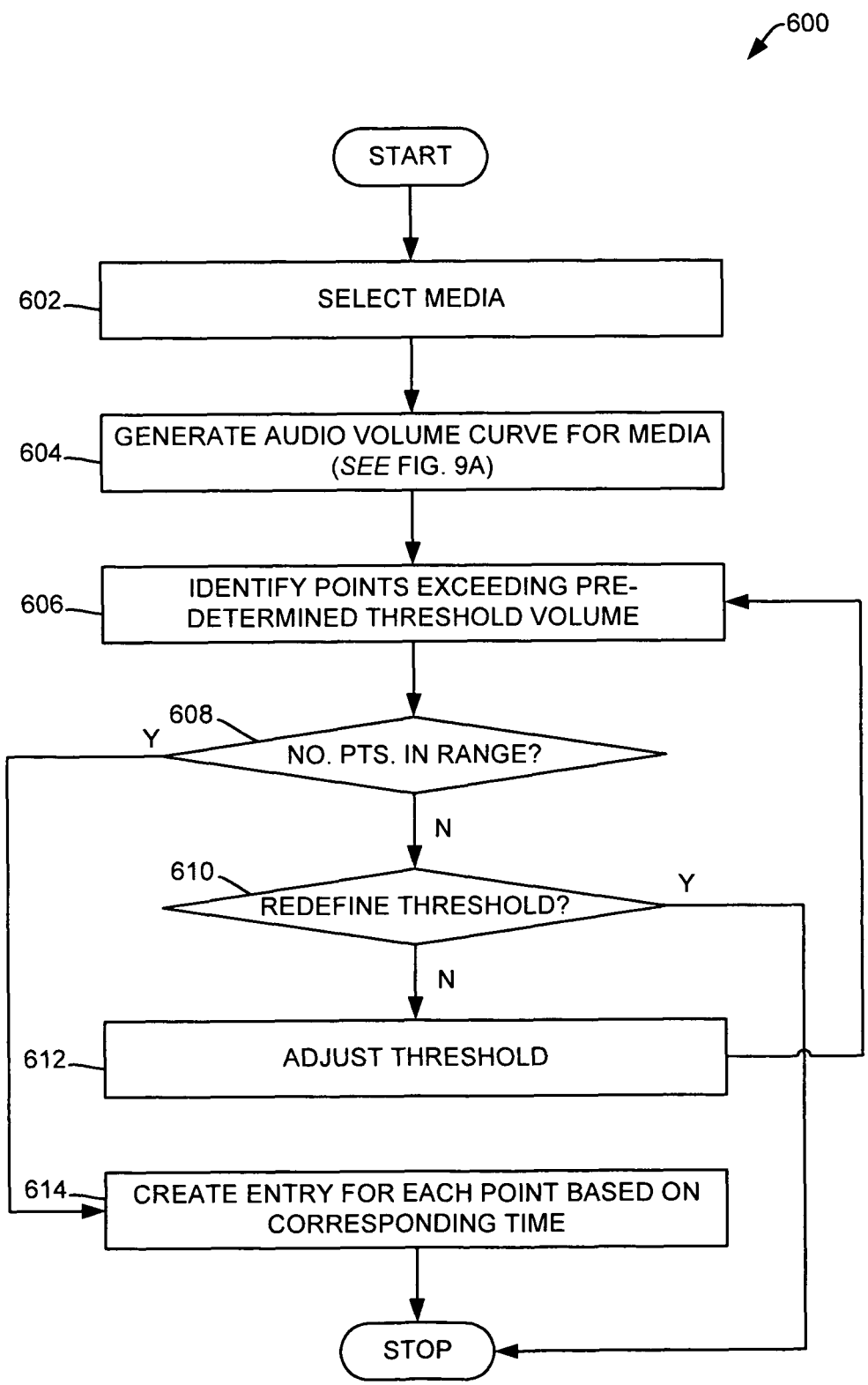
FIG. 6 is an illustrative flowchart for profiling audio media in accordance with embodiments of the present invention.

FIG. 6 is an illustrative flowchart for profiling audio media 600 in accordance with embodiments of the present invention. FIG. 6 further describes a step 304 (FIG. 3). As described herein, illustrative flowcharts may be utilized for candidates or for matching candidates without restriction. As noted above, an audio profile is a list of points in an audio file that exceed a pre-determined threshold. As may be appreciated, audio files may have any number of characteristics which may be utilized to identify and synchronize a particular audio file. In one embodiment, the pre-determined threshold corresponds with volume. In some embodiments, the pre-determined threshold may be automatically adjusted to provide a number of points within a desired range. The number of points may be utilized for additional synchronization. Thus, at a first step 602, media is selected. In some embodiments, media includes an audio tile or an audio/video file. At a next step 604, an audio volume curve is generated for a selected media. FIG. 9A is an illustrative representation of an audio volume curve graph 900 utilized for profiling media in accordance with embodiments of the present invention. An audio volume curve, in an embodiment, is a graphical representation of volume 902 over time 904. An audio volume curve may be generated utilizing any method well-known in the art without departing from the present invention. Returning to FIG. 6, at a next step 606, the method identifies any points exceeding a pre-determined threshold volume. As illustrated in FIG. 9A, a pre-determined threshold volume 906 may be selected. Points 908a-908f exceed pre-determined threshold volume 906 at times T1-T6.

At a next step 608 (FIG. 6), the method determines whether a number of points identified are within a desired range. As may be appreciated, if a pre-determined threshold volume is too low, then the number of points returned will be too high for efficient identification. Thus, an optimum range may be configured such that identification of media may be enhanced. In some embodiments, the range of points corresponds with a length of media. For example, where a desired number of points is equal to approximately one point for every three seconds of media, a 60 second selection of media would include approximately 20 identified points (i.e. a range of approximately 20). Thus, in this example, a pre-determined threshold volume may be selected that will identify approximately 60 points for three minutes of media. In other embodiments, a range of points may be an absolute number that does not correspond with a length of media. If the method determines that the number of points identified is within a desired range at a step 608, the method then proceeds to a step 614 to create an entry for each point based on a corresponding time whereupon the method ends. Entries may be stored in any manner known in the art without departing from the present invention.

If the method determines that the number of points identified is not within a desired range at a step 608, the method then determines whether to redefine a pre-determined threshold volume at a step 610. As noted above, selection of a pre-determined threshold volume may change the number of points identified. Lowering a pre-determined threshold volume generally raises the number of points identified while raising a pre-determined threshold volume generally lowers the number of points identified. In some embodiments, redefining a pre-determined threshold volume may not be desirable. Thus, if the method determines not to redefine a pre-determined threshold volume at a step 610, the method then proceeds to a step 614 to create an entry for each point based on a corresponding time whereupon the method ends. If the method determines to redefine a pre-determined threshold volume at a step 610, the method proceeds to a step 612 to adjust a pre-determined threshold volume whereupon the method returns to a step 606 to identify points exceeding a pre-determined threshold volume. By adjusting the pre-determined threshold volume in this manner, an audio file may be efficiently profiled for later synchronization.

Figure 7:
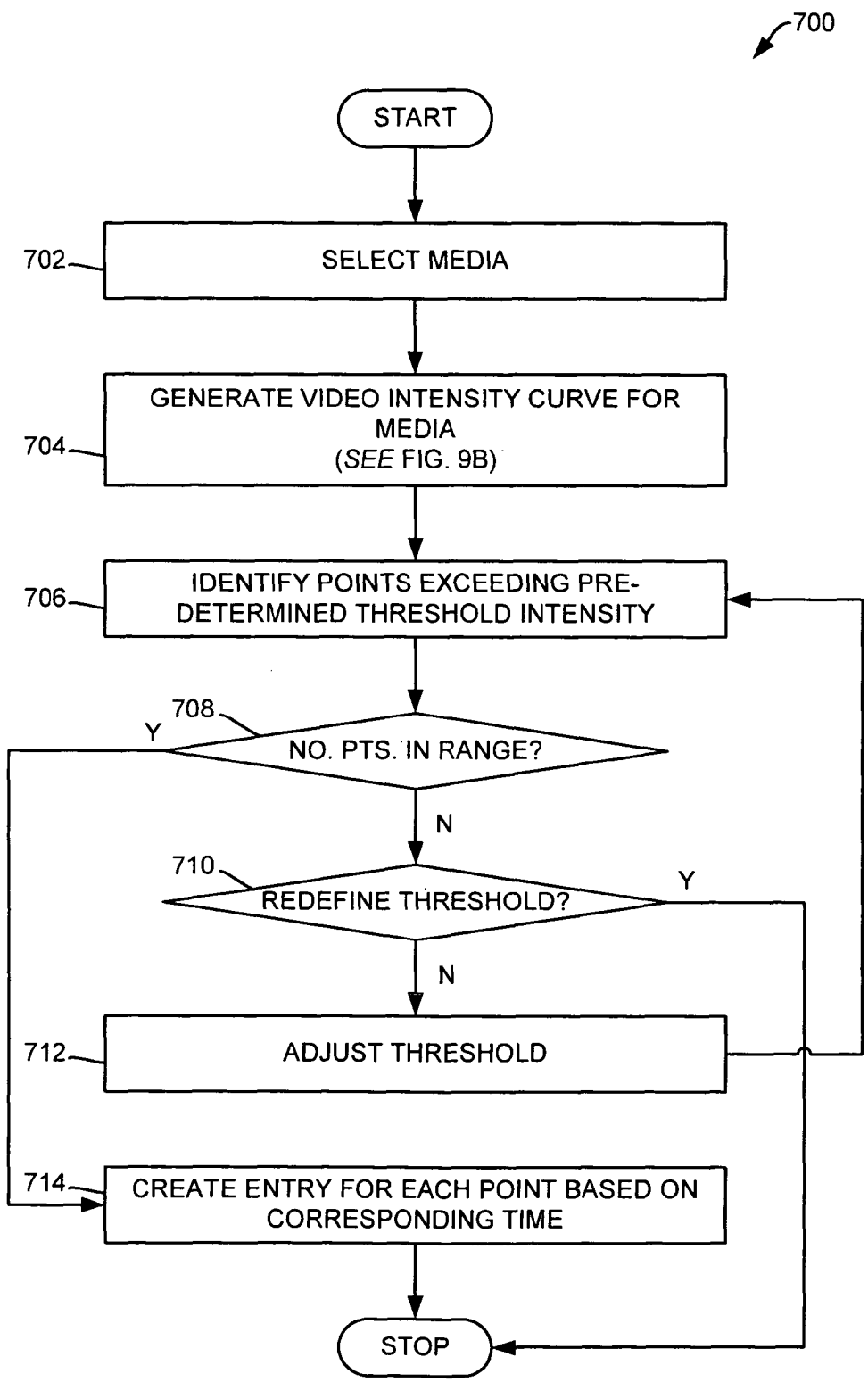
FIG. 7 is an illustrative flowchart for profiling video media in accordance with embodiments of the present invention.

FIG. 7 is an illustrative flowchart for profiling video media 700 in accordance with embodiments of the present invention. FIG. 7 further describes a step 304 (FIG. 3). As described herein, illustrative flowcharts may be utilized for candidates or for matching candidates without restriction. As noted above, a video profile is a list of points in an video file that exceed a pre-determined threshold. As may be appreciated, video files may have any number of characteristics which may be utilized to identify and synchronize a particular video file. In one embodiment, the pre-determined threshold corresponds with intensity. In some embodiments, the pre-determined threshold may be automatically adjusted to provide a number of points within a desired range. The number of points may be utilized for additional synchronization. Thus, at a first step 702, media is selected. In some embodiments, media includes an image file, a video file, or an audio/video file. At a next step 704, a video intensity curve is generated for the selected media. FIG. 9B is an illustrative representation of an video intensity curve graph 950 utilized for profiling media in accordance with embodiments of the present invention. A video intensity curve, in an embodiment, is a graphical representation of intensity 952 over time 954. A video intensity curve may be generated utilizing any method well-known in the art without departing from the present invention. Returning to FIG. 7, at a next step 706, the method identifies any points exceeding a pre-determined threshold intensity. As illustrated in FIG. 9B, a pre-determined threshold intensity 956 may be selected. Points 908a-d exceed pre-determined threshold intensity 956 at times T1-T4.

At a next step 708 (FIG. 7), the method determines whether a number of points identified are within a desired range. As may be appreciated, if a pre-determined threshold intensity is too low, then the number of points returned will be too high for efficient identification. Thus, an optimum range may be configured such that identification of media may be enhanced. In some embodiments, the range of points corresponds with a length of media. For example, where a number of points is equal to approximately one point for every three seconds of media, a 60 second selection of media would include approximately 20 points (i.e. a range of approximately 20). Thus, in this example, a pre-determined threshold intensity may be selected that will identify approximately 60 points for three minutes of media. In other embodiments, a range of points may be an absolute number that does not correspond with a length of media. If the method determines that the number of points identified is within a desired range at a step 708, the method then proceeds to a step 714 to create an entry for each point based on a corresponding time whereupon the method ends. Entries may be stored in any manner known in the art without departing from the present invention.

If the method determines that the number of points identified is not within a desired range at a step 708, the method then determines whether to redefine a pre-determined threshold intensity at a step 710. As noted above, selection of a pre-determined threshold intensity may change the number of points identified. Lowering a pre-determined threshold intensity generally raises the number of points identified while raising a pre-determined threshold intensity generally lowers the number of points identified. In some embodiments, redefining a pre-determined threshold intensity may not be desirable. Thus, if the method determines not to redefine a pre-determined threshold intensity at a step 710, the method then proceeds to a step 714 to create an entry for each point based on a corresponding time whereupon the method ends. If the method determines to redefine a pre-determined threshold intensity at a step 710, the method proceeds to a step 712 to adjust a pre-determined threshold intensity whereupon the method returns to a step 706 to identify points exceeding a pre-determined threshold intensity. By adjusting the pre-determined threshold intensity in this manner, an video file may be efficiently profiled for later synchronization.

As noted above for a step 210 (FIG. 2), synchronization may continue during playback. Utilizing points identified for both candidates and matching candidates, the method may adjust playback speeds to provide playback synchronization. For example, when a media play list is played, media is started at the same time utilizing methods providing herein. In this manner, a start synchronization is provided. During playback, some timing discrepancies across different devices may result in a loss of synchronization. Although exact synchronization is not necessary to provide an enjoyable user experience, some level of playback synchronization may be provided to enhance a user's experience. Points identified for a matching candidate may be evaluated with respect to a candidate to determine whether timing discrepancies have arisen in the playback of the matching candidate with respect to the candidate. If a discrepancy arises during playback, then the playback speed of a matching candidate may be adjusted to minimize or eliminate the discrepancy. Methods of playback speed adjustment are well-known in the art and maybe utilized without limitation without departing from the present invention.

FIG. 10 is an illustrative representation of graph 1000 demonstrating trimming in accordance with embodiments of the present invention. As noted above for a step 410 (FIG. 4A), exact matches are not required when selecting a matching candidate for synchronized play with a candidate. In some instances, a user may desire one selection of media over another. At least one issue when selecting a media that does not exactly match is duration of selected media. In a shared experience, shared media should start and end at substantially the same time. Thus, in FIG. 10, a graph 1000 of volume level 1002 over time 1004 of a matching candidate media is illustrated in accordance with embodiments of the present invention. In this example, a candidate media ends at time $T_{end1}$ 1012 and a selected matching candidate ends at time $T_{end2}$ 1014. Matching candidate volume level 1008 may be trimmed to end at $T_{end1}$ 1012 as indicated by dashed line 1016. In this manner, a matching candidate selection that is not an exact match may be conformed to play along with a candidate without disrupting a shared user experience. As may be appreciated, if a matching candidate is shorter in duration that a candidate, then no volumetric adjustment may be required. In some embodiments, where a matching candidate is shorter in duration, playback speed may be adjusted to match a candidate duration. In other embodiments, a notice to a user may be provided when a matching candidate is shorter in duration than a candidate.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for a synchronized media playback between a plurality of electronic media devices wherein the plurality of electronic media devices are in electronic communication with each other, the method comprising:

creating a media play list on a originating media device, wherein the media play list includes at least one candidate, the at least one candidate including a plurality of candidate indicia, selecting at least one member media device for sharing the media play list;

negotiating the media plays list by the at least one member media device wherein negotiating the media play list includes, searching the at least one member media device for at least one matching candidate, the at least one matching candidate including a plurality of matching candidate indicia, wherein the searching is enabled by comparing the plurality of candidate indicia with the plurality of matching candidate indicia, if the at least one matching candidate is found, selecting one of the at least one matching candidates for inclusion on a member media play list, conforming the at least one matching candidate based on the plurality of candidate indicia and on plurality of matching candidate indicia when the at least one matching candidate is not an exact match with the at least one candidate, wherein the conforming includes, determining a candidate duration of the at least one candidate, determining a matching candidate duration of the at least one matching candidate selected, if the matching duration is longer than the candidate duration, trimming the matching duration such that the matching duration is substantially equal to the candidate duration, if the matching duration is shorter than the candidate duration, generating a notice, and populating the member media play list with at least one matching candidate; and playing the media play list and the member media play list, wherein at least one candidate and the at least one matching candidate are started at substantially the same time on all devices such that a start synchronizing is achieved.

2. The method of claim 1 wherein, the creating the media play list comprises:

selecting the at least one candidate for inclusion on the media play list, identifying the plurality of candidate indicia corresponding with the at least one candidate, and appending the media play list to include the at least one candidate and the plurality of candidate indicia; and wherein, the selecting one of the at least one matching candidates comprises:
  selecting the at least one matching candidate for inclusion on the member media play list, and
  identifying the plurality of matching candidate indicia corresponding with the at least one matching candidate.

3. The method of claim 2 wherein the plurality of candidate indicia is selected from the group consisting of: a candidate title, a candidate artist, a candidate duration, a candidate identifier, a candidate audio profile, and a candidate video profile, and wherein the plurality of matching candidate indicia is selected from the group consisting of: a matching title, a matching artist, a matching duration, a matching identifier, a matching audio profile, and a matching video profile.

4. The method of claim 3 further comprising:
  synchronizing the at least one candidate and the at least one matching candidate during a media playback such that a playback synchronizing is achieved, the playback synchronizing including,
    determining a synchronization state of the at least one matching candidate based upon the candidate audio profile and the matching audio profile, the determining proceeding at a sampling rate,
    if the playback synchronization is achieved, continuing to the determining a synchronization state at the sampling rate, and
    if the playback synchronization is not achieved, adjusting a playback speed of the at least one matching candidate to match the at least one candidate.

5. The method of claim 4 wherein the playback synchronization is achieved when the playback synchronization falls within a range of approximately 0 to 1000 milliseconds (ms).

6. The method of claim 4 wherein the sampling rate falls within a range of approximately 100 to 5000 ms.

7. The method of claim 1 further comprising:
  before the selecting one of the at least one matching candidates, sorting the at least one matching candidates in an order of closest duration.

8. The method of claim 1 further comprising:
  if the at least one matching candidate is not found, uploading the at least one matching candidate from an external media source.

9. The method of claim 8 wherein the external media source is selected from the group consisting of: the originating media device, the at least one member media device, a media server, and an external media storage device.

10. The method of claim 3 wherein the identifying the candidate audio profile comprises:
  determining a candidate audio volume curve for the at least one candidate;
  identifying at least one point on the candidate audio volume curve that exceeds a pre-determined threshold volume at a corresponding time; and
  creating a candidate audio profile entry corresponding with the point and the corresponding time.

11. The method of claim 10 wherein if the identifying at least one point returns a number of points that are outside a first pre-determined range, adjusting the pre-determined threshold volume such that the number of points falls within the first pre-determined range.

12. The method of claim 3 wherein the identifying the candidate video profile comprises:
  determining a candidate video intensity curve for the at least one candidate;
  identifying at least one point on the candidate video intensity curve that exceeds a pre-determined threshold intensity at a corresponding time; and
  creating a candidate video profile entry corresponding with the point and the corresponding time.

13. The method of claim 12 wherein if the identifying at least one point results a number of points that are outside a second pre-determined range, adjusting the pre-determined threshold intensity such that the number of points falls within the second pre-determined range.

14. The method of claim 3 wherein the identifying the matching audio profile comprises:
  determining a matching audio volume curve for the at least one matching candidate;
  identifying at least point on the matching audio volume curve that exceeds a pre-determined threshold volume at a corresponding time; and
  creating a matching audio profile entry corresponding with the point and the corresponding time.

15. The method of claim 14 wherein if the identifying at least one point results a number of points that are outside a third pre-determined range, adjusting the pre-determined threshold volume such that the number of points falls within the third pre-determined range.

16. The method of claim 3 wherein the identifying the matching video profile comprises:
  determining a matching video intensity curve for the at least one matching candidate;
  identifying at least one point on the matching video intensity curve that exceeds a pre-determined threshold intensity at a corresponding time; and
  creating a matching video profile entry corresponding with the point and the corresponding time.

17. The method of claim 16 wherein if the identifying at least one point results a number of points that are outside a fourth pre-determined range, adjusting the pre-determined threshold intensity such that the number of points falls within the fourth pre-determined range.

18. The method of claim 1 wherein the electronic communication is enabled utilizing one selected from the group comprising: a wired connection and a wireless connection.

19. The method of claim 1 further comprising:
  associating the at least one candidate on the media play list and the at least one matching candidate on the member media play list;
  creating an association list based on the associating; and
  storing the association list to provide a future configuration.

20. A method for synchronized media playback between a plurality of media devices wherein the plurality media devices are in electronic communication, the method comprising:
  creating a media play list on an originating media device, wherein the media play list includes at least one candidate, the at least one candidate including a plurality of candidate indicia,
  selecting at least one member media device for sharing the media play list;
  negotiating the media play list by the at least one member media device wherein the negotiating the media play list includes,
    searching the at least one member media device for at least one matching candidate, the at least one matching candidate including a plurality of matching candidate indicia, wherein the searching is enabled by comparing the plurality of candidate indicia with the plurality of matching candidate indicia, if the at least one matching candidate is found, selecting one of the at least one matching candidates for inclusion on a member media play list, conforming the at least one matching candidate based on the plurality of candidate indicia and on the plurality of matching candidate indicia when the at least one matching candidate is not an exact match with the at least one candidate, wherein the conforming includes, determining a candidate duration of the at least one candidate, determining a matching duration of the at least one matching candidate selected, if the matching duration is longer than the candidate duration, trimming the matching duration such that the matching duration is substantially equal to the candidate duration, if the matching duration is shorter than the candidate duration, generating a notice, and populating the member media play list with the at least one matching candidate: and playing the media play list and the member media play list, wherein the lists are started at substantially the same time on all devices such that a start synchronizing is achieved.

21. The method of claim 20 wherein the plurality of candidate indicia is selected from the group consisting of: a candidate title, a candidate artist, a candidate duration, a candidate identifier, and a candidate video profile, and wherein the plurality of matching candidate indicia is selected from the group consisting of: a matching title, a matching artist, a matching duration, a matching identifier, and a matching video profile.

22. The method of claim 21 further comprising:

synchronizing the at least one candidate and the at least one matching candidate during media playback such that a playback synchronizing is achieved, the playback synchronizing including, determining a synchronization state of the at least one matching candidate based upon the candidate video profile and the matching video profile, the determining proceeding at sampling rate, if the playback synchronization is achieved, continuing to the determining a synchronization state at the sampling rate, and if the playback synchronization is not achieved, adjusting a playback speed of the at least one matching candidate to match the at least one candidate.

23. Computing device program product for synchronized media playback between a plurality of media devices using a computing device, the computing device program product comprising:

a computer readable storage medium;

first instructions for creating a media play list on a originating media device, wherein the media play list includes at least one candidate, the at least one candidate including a plurality of candidate indicia, second instructions for selecting at least one member media device for sharing the media play list;

third instructions for negotiating the media plays list by the at least one member media device wherein negotiating the media play list includes, fourth instructions for searching the at least one member media device for at least one matching candidate, the at least one matching candidate including a plurality of matching candidate indicia, wherein the searching is enabled by comparing the plurality of candidate indicia with the plurality of matching candidate indicia, if the at least one matching candidate is found, fifth instructions for selecting one of the at least one matching candidates for inclusion on a member media play list, sixth instructions for conforming the at least one matching candidate based on the plurality of candidate indicia and on plurality of matching candidate indicia when the at least one matching candidate is not an exact match with the at least one candidate, wherein the conforming includes, determining a candidate duration of the at least one candidate, determining a matching candidate duration of the at least one matching candidate selected, if the matching duration is longer than the candidate duration, trimming the matching duration such that the matching duration is substantially equal to the candidate duration, if the matching duration is shorter than the candidate duration, generating a notice, and seventh instructions for populating the member media play list with at least one matching candidate; and eighth instructions for playing the media play list and the member media play list, wherein the lists are started at substantially the same time on all devices such that a start synchronizing is achieved.

* * * * *